Dec. 10, 1963    R. H. JORDAN    3,113,657
COIN OPERATED LOCK

Filed Aug. 31, 1960    7 Sheets-Sheet 1

INVENTOR.
RICHARD H. JORDAN
BY
Oldham & Oldham
ATTYS.

Dec. 10, 1963     R. H. JORDAN     3,113,657
COIN OPERATED LOCK
Filed Aug. 31, 1960     7 Sheets-Sheet 2

INVENTOR.
RICHARD H. JORDAN
BY
Oldham & Oldham
ATTYS.

Dec. 10, 1963

R. H. JORDAN 3,113,657

COIN OPERATED LOCK

Filed Aug. 31, 1960

INVENTOR.
RICHARD H. JORDAN
BY
Oldham & Oldham
ATTYS.

Dec. 10, 1963     R. H. JORDAN     3,113,657
COIN OPERATED LOCK Filed Aug. 31, 1960     7 Sheets-Sheet 4

INVENTOR.
RICHARD H. JORDAN
BY
Oldham & Oldham
ATTYS.

Dec. 10, 1963   R. H. JORDAN   3,113,657
COIN OPERATED LOCK

Filed Aug. 31, 1960   7 Sheets-Sheet 6

INVENTOR.
RICHARD H. JORDAN
BY Oldham & Oldham
ATTYS.

Dec. 10, 1963   R. H. JORDAN   3,113,657
COIN OPERATED LOCK
Filed Aug. 31, 1960   7 Sheets-Sheet 7

INVENTOR.
RICHARD H. JORDAN
BY Oldham & Oldham
ATTYS.

United States Patent Office 3,113,657
Patented Dec. 10, 1963

3,113,657
COIN OPERATED LOCK
Richard H. Jordan, Mansfield, Ohio, assignor to J. Austin Smith & Son, New York, N.Y., a partnership
Filed Aug. 31, 1960, Ser. No. 53,187
12 Claims. (Cl. 194—65)

This invention relates to coin operated locks for use with storage lockers, service lockers, dispensing lockers, and the like.

It is the general object of the invention to provide an improved, relatively inexpensive, fool-proof, and long-lived coin operated lock adapted for use with storage lockers, service lockers, dispensing lockers, and the like.

Another object of the invention is to provide a lock of the character described wherein the rigidity of the coin is utilized to operate the lock, which means that no paper or cardboard slug can be used to operate the lock.

Another object of the invention is the provision of a lock of the type described which by a simple adjustment can be used with either a quarter, a nickel, a dime, or a token.

Another object of the invention is the provision of a coin operated lock in which a coin deposited in the lock to allow its operation is retained in the lock until the key is returned and the door is unlocked. This is desirable for service lockers where a coin deposit is required to insure the return of the key when a location owner wants to give free service, for example at a swimming pool for use of the lockers by members.

Another object of the invention is the provision of a coin operated lock wherein by a very simple change the lock can be constructed so as to either lock with the coin or unlock with the coin. When the lock is constructed to lock with a coin it adapts itself to coin operated storage lockers, and when adapted to unlock with a coin the lock is adapted to dispensing lockers, for example, for dispensing bowling balls or shoes in exchange for a coin.

Another object of the invention is to provide a lock of the character described wherein the lock barrel can be readily removed by an operator and a new lock barrel inserted in the event a key is lost, or if it is desirable to change the lock barrels periodically to discourage attempts to make duplicate keys.

Another object of the invention is to provide a coin operated lock having a key which is adapted to be withdrawn from the lock, and with means being provided to prevent the insertion of another coin during such time as the key is withdrawn.

Another object of the invention is the provision of a coin operated lock including a key, and in which the life of the lock cylinder is doubled by only having to either lock or unlock and not both.

Another object of the invention is to provide a coin operated lock which cannot be operated twice from a single coin and in which partial unlocking enough to swing the door open is prevented.

Another object of the invention is to provide a lock for the purposes indicated and which can be operated by a token which can be sold for any desired price.

For a better understanding of the invention reference should be had to the accompanying drawings wherein.

Figures 1, 11, 12, 13:
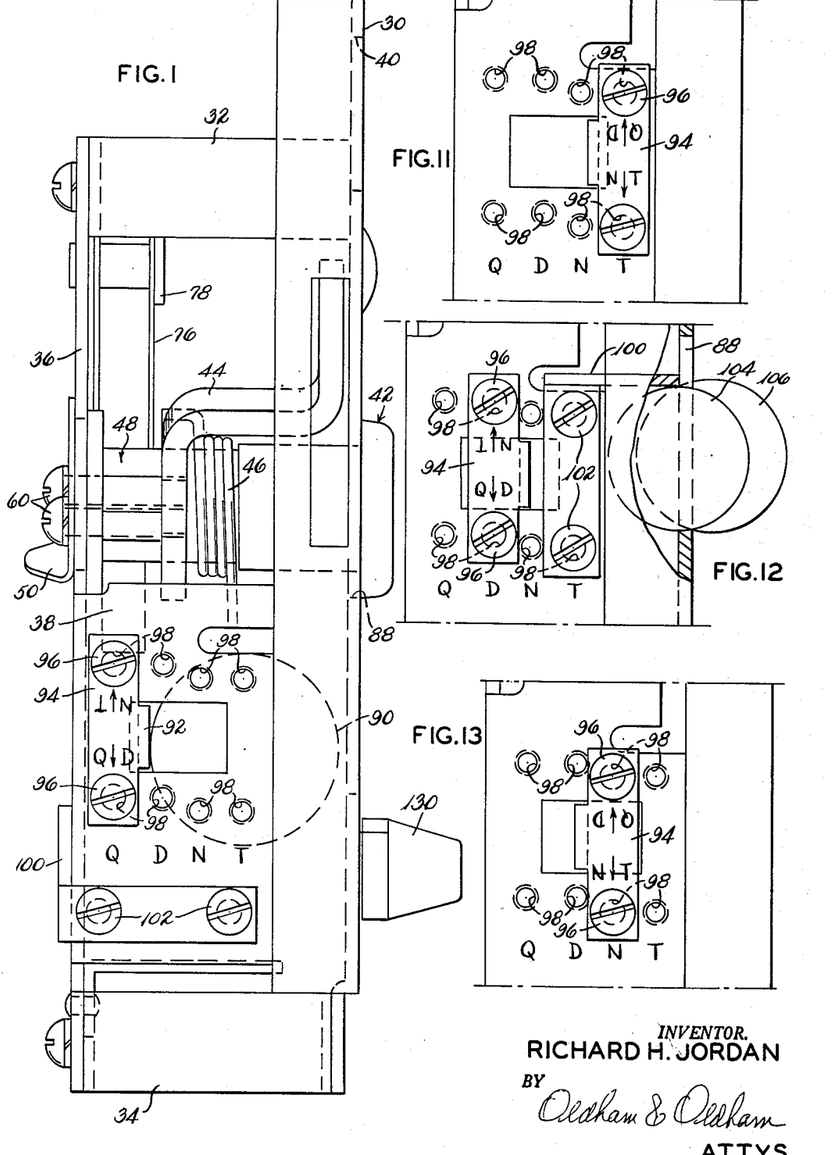
FIG. 1 is a side elevation of one embodiment of the improved lock incorporating the principles of the invention, and with the lock shown in unlocked position.
FIG. 11 is a fragmentary view of a portion of FIG. 1 but illustrating the adjusting piece marked QDNT turned to position the piece so that the lock will handle tokens.
FIG. 12 is a view similar to FIG. 11 but illustrating the adjusting piece positioned to handle dimes.
FIG. 13 is similar to FIG. 12 but illustrates the adjusting piece positioned so that the lock will handle nickels.
Figures 2, 6, 7:
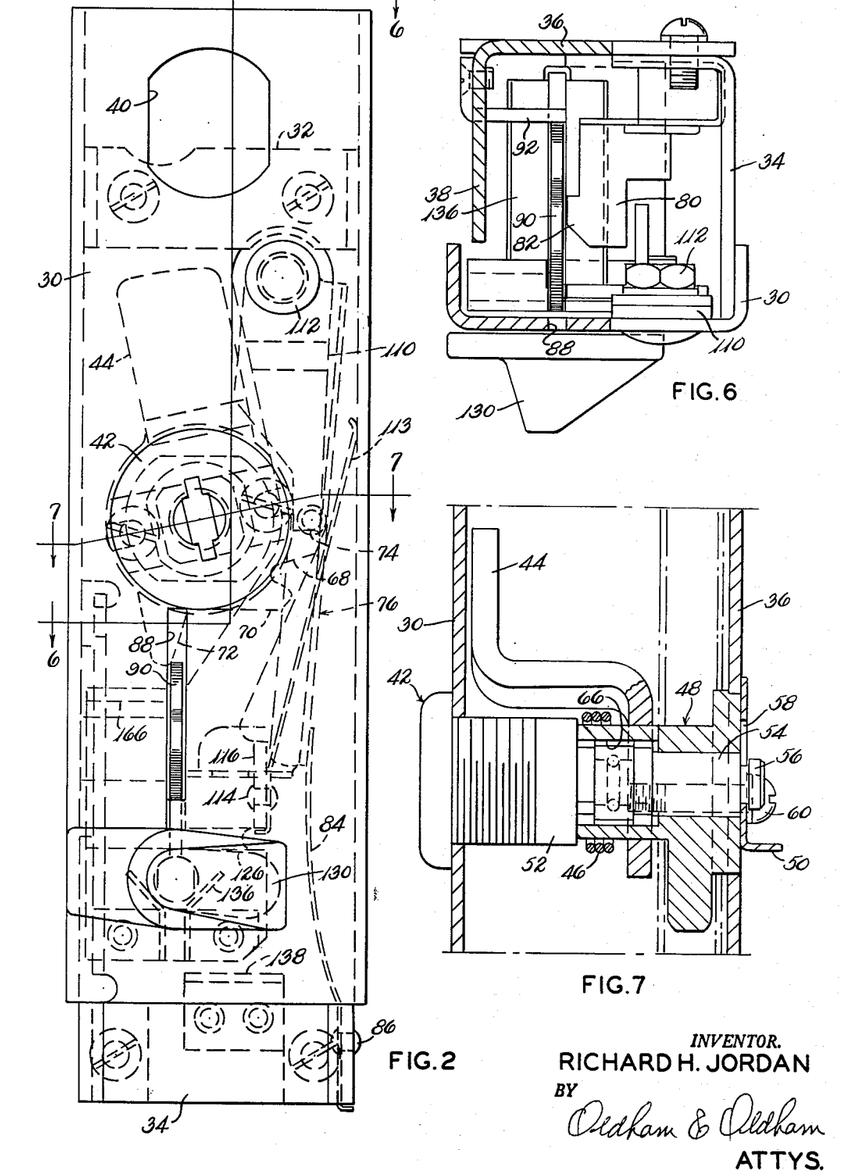
FIG. 2 is a front view of the lock of FIG. 1.
FIG. 6 is a view taken on line 6—6 of FIG. 2 and illustrating portions of the lock in horizontal section.
FIG. 7 is substantially a horizontal cross-sectional view taken on line 7—7 of FIG. 2.
Figures 9, 14, 15:
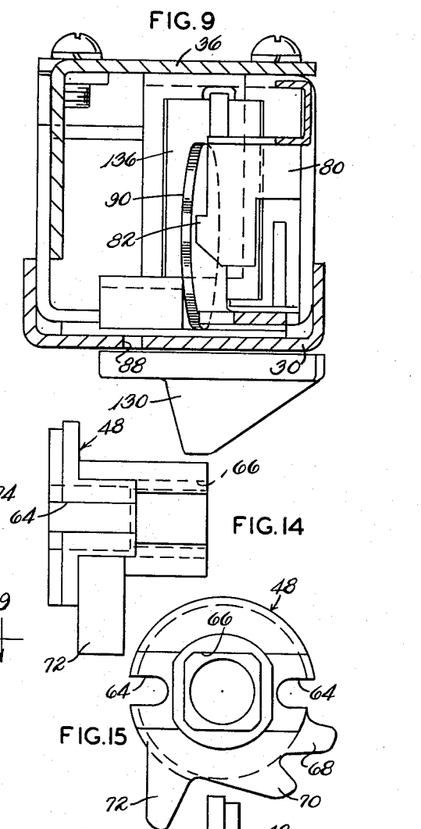
FIG. 9 is a horizontal cross-sectional view taken substantially on line 9—9 of FIG. 4.
FIGS. 14, 15 and 16 are respectively side elevation, end view, and opposite side elevation of the latching member associated with the lock barrel.
Figure 16:
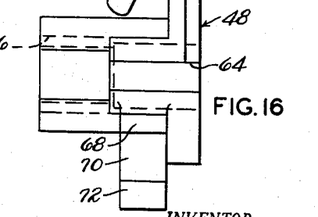

In the drawings, the numeral 30 indicates the channel front of the lock to which is secured a top bracket 32 and a bottom bracket 34 on which brackets are mounted a back plate 36 having an integral side flange 38, all as best seen in FIGS. 1, 6 and 9.

The basic lock structure so fare described is conveniently but not necessarily made as a unit which can be plugged into position in the frame of a locker door or door jamb and removably locked in position therein. This is normally accomplished by making the bottom bracket 34 of slightly smaller size than the rest of the assembly so that it can be stabbed into a socket, and with the channel 30 near its upper end being provided with an opening 40 for receiving a lock not shown, and operated by a master key to lock the entire lock assembly in position or to allow its removal. This feature of the invention is not new and will not be described in detail.

Figure 4:
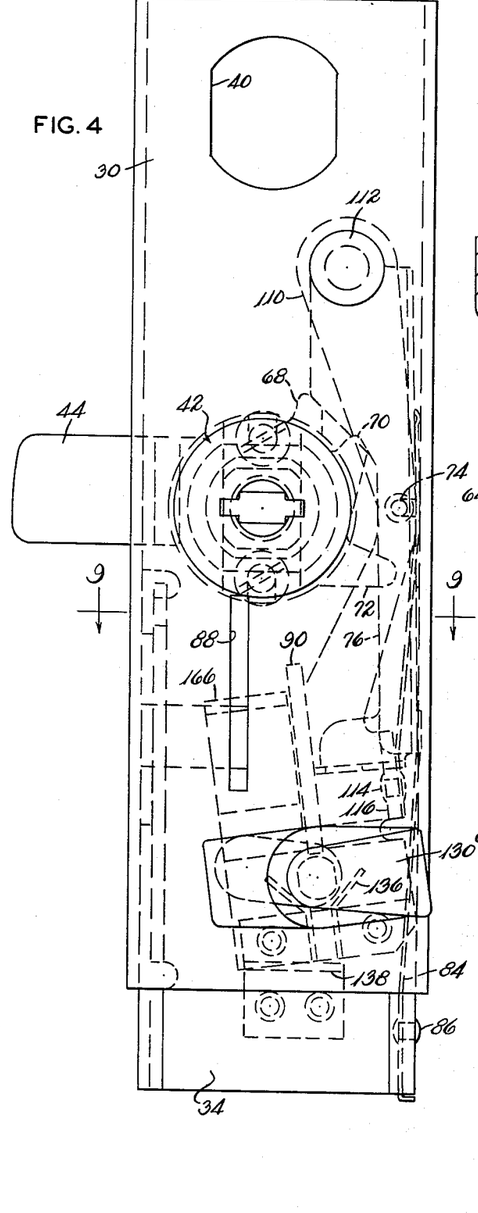
FIG. 4 is a front elevation of the lock and is similar to FIG. 2 except that FIG. 4 shows the lock in locked position.

Rotatably mounted between the channel front 30 and the back plate 36 is a lock barrel and latch assembly indicated as a whole by the numeral 42 and carrying a lock bolt 44 normally held in the unlocked position shown in FIG. 2 but resiliently urged by a coiled spring 46 to the locked position shown in FIG. 4. The lock and latch mechanism 42 includes a latch 48 and a slide means 50 for releasably locking the lock and latch mechanism 42 in rotary position in the frame assembly.

For a better understanding of the construction of the lock and latch mechanism 42 reference should be to FIGS. 7, 8 and 14 through 16. More specifically the mechanism 42 includes a key operated lock barrel 52 of the well known type in which the key can be removed only when the lock is turned to one extreme end of its travel. The lock barrel 52 is secured to an extension 54 terminating in a headed end 56 received in a keyhole slot 58 formed in the slide 50 whereby when the slide 50 is moved downwardly from its position shown in FIG. 7 and FIG. 8, the lock barrel 52 and the extension 54 can be removed from the latch 48 and a new barrel and extension can be inserted. Screws 60 extending through slots 62 in the slide 50 and through grooves 64 in the latch 48 are received in tapped holes in the lock bolt 44 and act as guides for the slide 50.

The latch 48 has a noncircular bore 66 receiving noncircular portions of the lock barrel 52 or extension 54 or both so that the latch 48 can be turned by the turning of the key in the lock barrel 52, as will be understood. The latch 48 has three latching lugs thereon indicated by the numeral 68, 70 and 72, with lug 68 engaging behind a pin 74 as seen in FIG. 2 to hold the lock bolt 44 normally in the unlocked position of FIG. 2 and against the action of spring 46 tending to turn the lock bolt 44 into locked position of FIG. 4.

The portion of latch 48 adjacent the back plate 36 is formed as a bearing and is received in a hole in the back plate, as best seen in FIG. 7, and with the slide 50 being of larger diameter than the hole in the back plate so that not only is a back bearing provided for the lock and latch mechanism 42, but the latch 48 and its associated mechanism is retained in position when the lock barrel 52 is removed for the substitution of another lock, in the manner previously described.

Figures 20, 21, 22, 23:
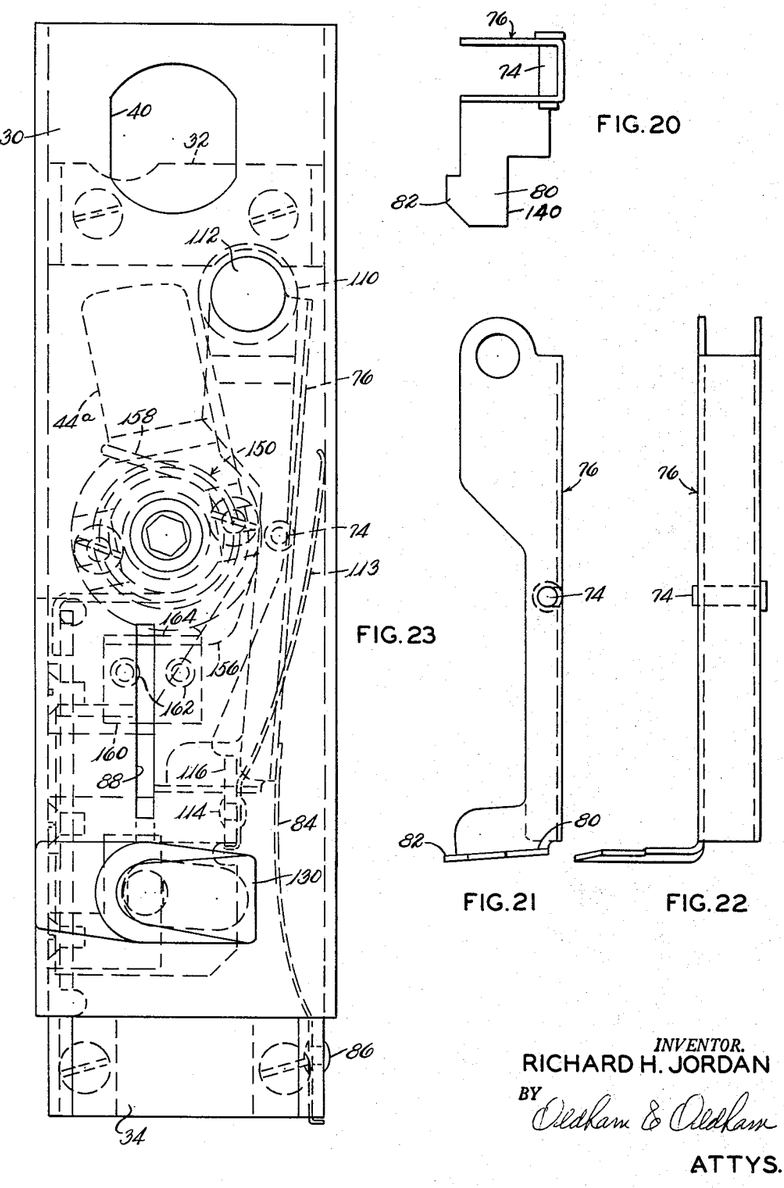
FIGS. 20, 21 and 22 are respectively plan view, front elevation and side elevation of a lever incorporated in the lock assembly.
FIG. 23 is a view similar to FIG. 2, constituting a front elevation of the lock assembly, but with the lock assembly of this figure being converted to unlock with a coin.

Pin 74 is carried by the lever 76 and shown in FIGS. 20 through 22. Lever 76 is pivotally mounted at its upper end on a post 78 and is provided at its lower end with a flat plate 80, best seen in FIG. 20. The plate 80 has a surface 82 adapted to be engaged with the coin operating the lock, all in a manner hereinafter to be described. Lever 76 is normally urged to the left, as seen in FIG. 2, to hold the pin 74 in engagement with the lug 68, this being accomplished by means of a ribbon spring 84 secured to the lower bracket 34 by a rivet 86.

Again looking at FIG. 2 the channel 30 is formed with a coin receiving slot 88 of a size to receive a quarter. In FIGS. 1 and 2 the numeral 90 indicates a quarter which has been pushed through the slot 88 and with the back edge of the quarter engaging with a lip 92 formed at right angles on a coin size adjusting member 94 having the notations QDNT thereon and secured by screws 96 into any selected pair of vertically aligned tapped holes 98 and marked D, N, T and Q. For operations upon quarters the mark Q and the arrow on the coin size adjusting member 94 are aligned with the Q marking on the side flange 38 of the back plate 36 in the manner shown in FIG. 1. For operations upon tokens the coin size adjusting member 94 is positioned as shown in FIG. 11, for operations upon dimes the member 94 is positioned as shown in FIG. 12, and for operations upon nickels the coin size adjusting member 94 is positioned at shown in FIG. 13.

Only in the case of operations upon dimes, as shown in FIG. 12, is it necessary to reduce the size of the coin receiving slot 88, and this is accomplished as illustrated in this figure by employing a coin slot size reducing bracket 100 which is secured by screws 102 in the tapped holes 98 above the letter T, and with the bracket 100 including a portion reducing the size of the coin slot 88, so that a dime 104 can still be received through the slot 88, but a penny 106 cannot. The bracket 100 with its screws 102 is conveniently stored on the lock assembly in the manner shown in FIG. 1 when the lock is not adapted for use with dimes.

Figure 17:
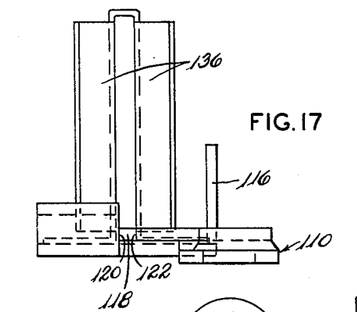
FIGS. 17, 18 and 19 are respectively plan view, front elevation, and side elevation of a lever means incorporated in the lock assembly.
Figure 18:
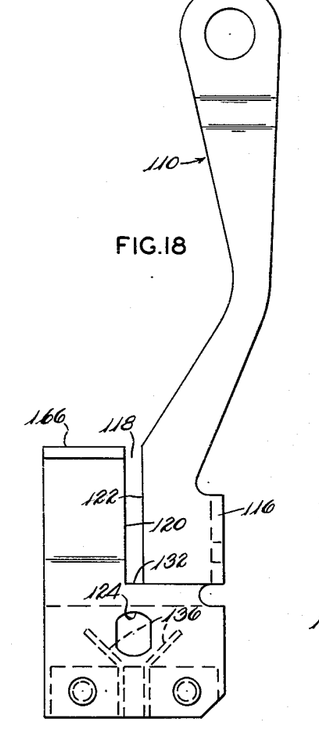
Figure 19:
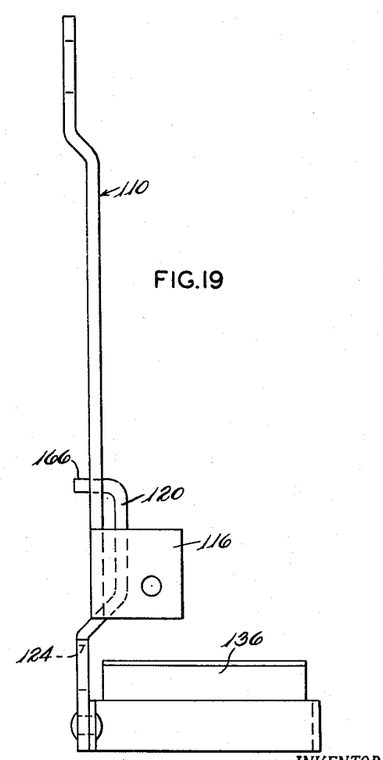

A lever means indicated as a whole by the numeral 110 and illustrated in the three views FIGS. 17 through 19 is pivotally secured at its upper end by a bolt 112 to the channel 30, and is biased to the left, in FIG. 2, by means of a ribbon spring 113 secured by a rivet 114 to a bracket 116 formed on the lever 110.

An important feature of the invention is that the lever means 110 is provided with a coin receiving slot 118 which is adapted to be in alignment with the coin receiving slot 88 when the lock is in the unlocked position of FIG. 2.

The coin receiving slot 118 is made so as to have an effective depth in the direction in which the coin is inserted into the slot so that the slot 118 can grip the edge of the coin and operate through the rigidity of the coin itself to engage another portion of the coin with the surface 82 on lever 76 to thereby move pin 74 from behind lug 68 and allow the lock bolt 44 to swing to locked position under the action of spring 46, all heretofore described.

Figures 3, 8:
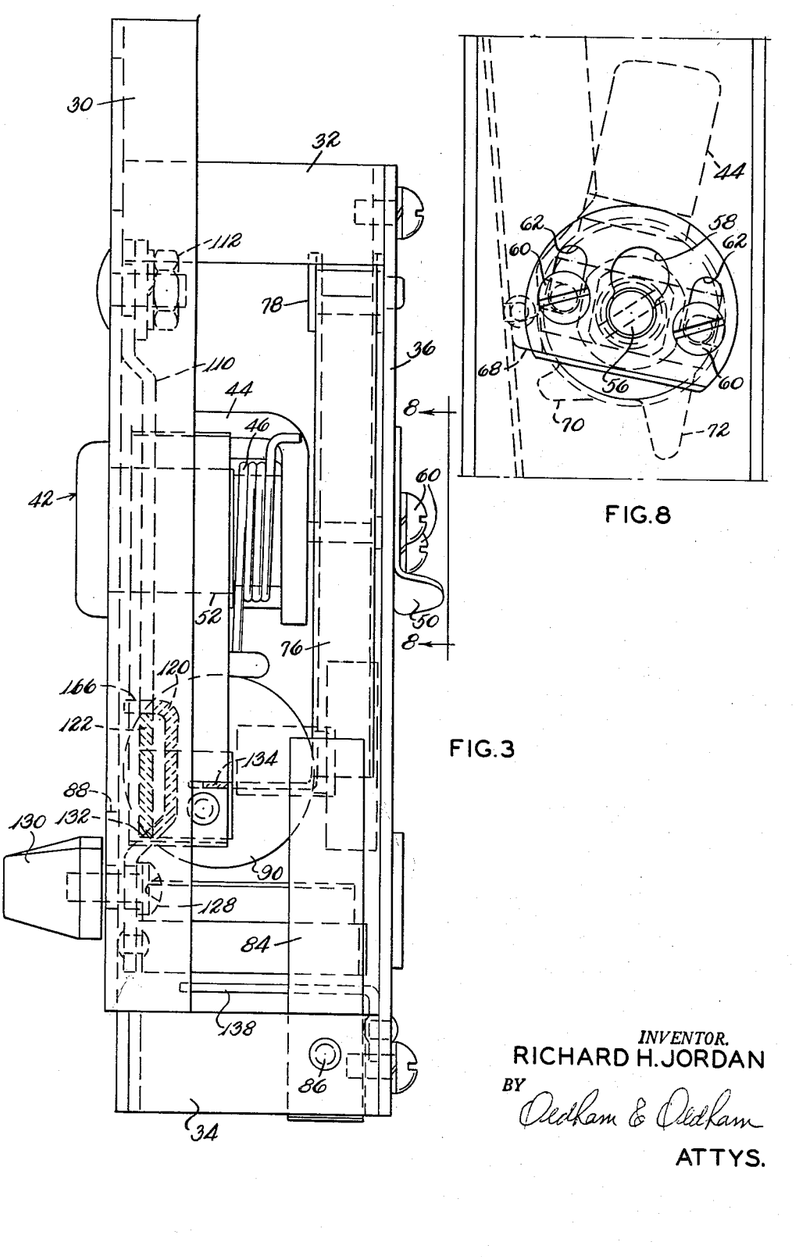
FIG. 3 is a view in side elevation of the other side of the lock shown in FIG. 1.
FIG. 8 is a back elevation taken on line 8—8 of FIG. 3 and illustrating details of the mechanism for locking the lock barrel in the lock.

One convenient manner of making the coin slot 118 to have a depth in the direction in which the coin is inserted into it is to offset one side of the coin receiving slot 118 from the plane of the main body of the lever means 110. More particularly, a flange 120 is offset as best seen in FIG. 19 to provide opposed edges 122 and 120 for the coin receiving slot 118 which rigidly grips the coin as it becomes slightly tilted in the transmission of force to the lever 76, all as best seen in FIG. 3. The coin gripping surfaces 120 and 122 have been shaded with dotted lines cross sectionally arranged in FIG. 3.

The lower end of the lever means 110 has a hole 124 therein in alignment with a laterally extending slot 126 formed in the channel front 30, and a screw 128 extends through the hole 124 and the slot 126 to secure a knob 130 to the lower end of the lever means 110, the knob 130 being positioned on the front of the channel 30 in the manner seen in the various drawings.

As best seen in FIG. 3, the coin receiving slot 118 in the lever means 110 has its lower edge 132 positioned slightly below the lower edge of the coin receiving slot 88, so that when a coin 90 is moved through the coin slot 88 and moves downwardly by gravity, the coin comes to rest against the lower edge 132 of the coin slot 118 and the bracket 92 of the coin size adjusting member 94, with the front edge of the coin having clearance behind the channel front 30 as evident in FIGS. 1, 3 and 6.

It will be noted here that the location of the lower edge 132 of coin receiving slot 118 of lever means 110 in relation to the lip 92 of coin size adjusting member 94 is arranged so that the next smaller size coin will not be caught and held between these two points but will fall free through the lock so that the lock cannot be operated. On the other hand, the next larger size coin will not penetrate the coin slot 88 of front channel 30 far enough to clear slot 88 and will thereby prevent the functioning of the mechanism.

With the coin deposited in the lock in the manner shown in FIG. 3 the knob 130 can now be moved to the right to move the parts to the position shown in FIG. 4, the force between the lever means 110 and the lever 76 being transmitted through the coin 90, the coin being gripped between the surfaces 120 and 122 along one edge of the coin by the slight tilting action of the coin as the center of the coin engages over another area marked 134 with the surface 82 of lever 76 to thereby move pin 74 out from behind lug 68 to allow the lock bolt 44 to move into the locked position shown in FIG. 4, the lever means 110 and lever 76 compressing respectively ribbon springs 112 and 84 during this movement. The moving of the knob 130 to the right also slides the coin 90 past the end of the restraining back stop lip or bracket 92 of coin size adjusting member 94. The coin now is held in position only by the lateral forces between the levers 110 and 76 as effected by the ribbon springs 112 and 84. With the turning of the lock bolt 44 to the locked position, lug 72 of the latch 48 moves to a point to almost engage inner surface of lever 76 as best shown in FIG. 4.

With the lock in the locked position of FIG. 4 it is now possible for the operator of the lock to remove the key from the lock mechanism 42 having, for example, stored his luggage in the locker. It will be recognized that the locking of the locker has been accomplished without the necessity to operate the key.

Figures 5, 10, 24, 25, 26:
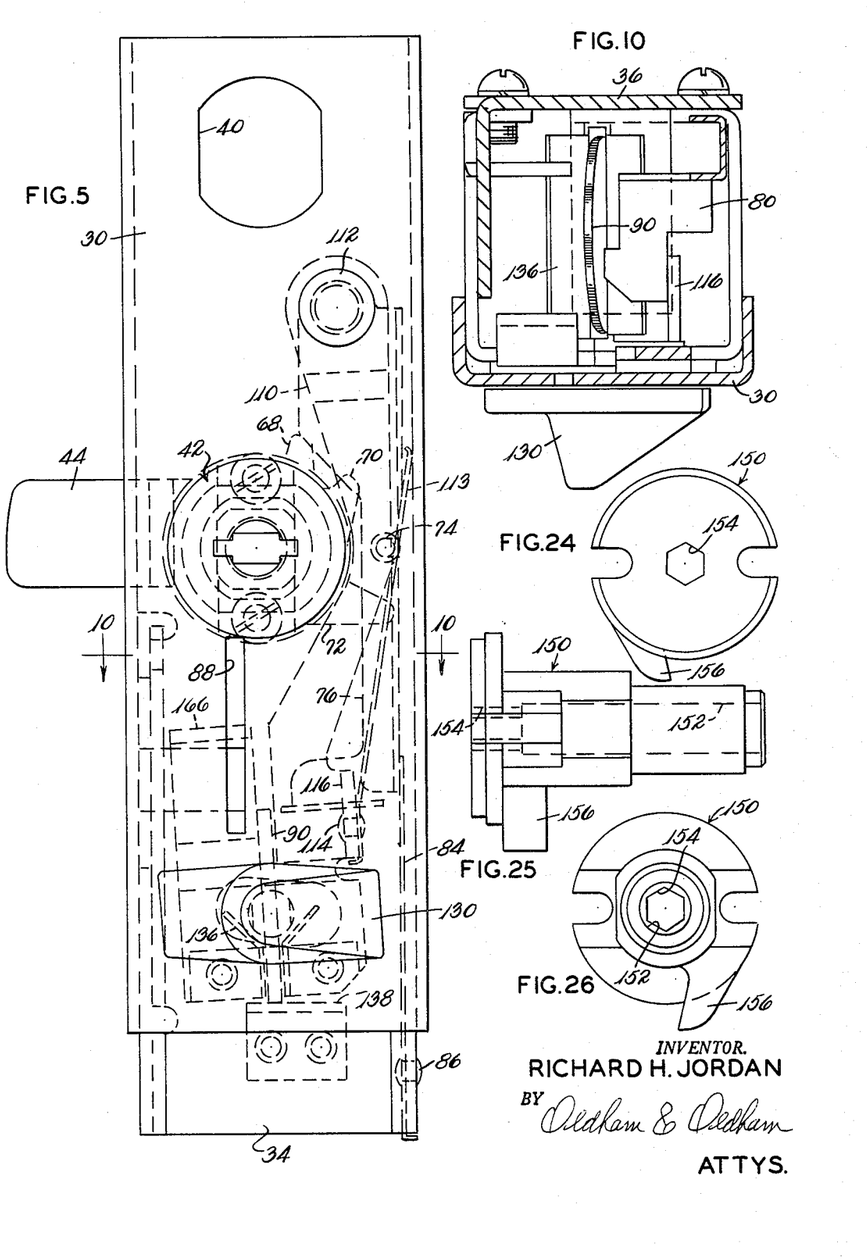
FIG. 5 is a view similar to FIG. 4, but with the coin now stored in the lock.
FIG. 10 is a horizontal cross-sectional view taken substantially on line 10—10 of FIG. 5.
FIGS. 24, 25, and 26 are respectively one end view, a side elevation, and the other end view of a latching member incorporated in the lock structure of FIG. 23.

The release of the hand pressure on the knob 130 with the parts moved to the position of FIG. 4 results in the positioning of the parts in the manner shown in FIG. 5.

Spring 113 has begun the return movement of the lever means 110 to the left, thereby relieving the lateral pressure on the coin 90, and thus the lateral pressure on the lever 76, so that the coin 90 can now roll, by gravity, off of retaining edge 132 of coin slot 118 of lever 110 since coin 90 no longer engages lip 92, and the coin drops into a funnel guide 136 secured to the lower end of the lever means 110. The coin 90 does not drop completely through the funnel guide 136 because a shelf 138 secured to the bottom bracket 34 engages with the lower edge of the coin. The movement to the left of the lever 76 is terminated by the engagement of the lug 72 with the side of the lever 76 in the manner best seen in FIG. 5, the lug 72 being carried by the latch 48. With the movement to the left of lever 76 stopped by the lug 72, the movement to the left of lever means 110 is likewise stopped with the parts as shown in FIG. 5 because the bracket 116 carried by the lever means 110 engages with the side 140 of bracket 80 of lever 76 in the manner best seen in FIG. 10. Thus, the coin 90 is retained in the lock and is carried by funnel 136 and rests on shelf 138 during the time that the lock is locked and the key withdrawn.

This arrangement particularly facilitates the coin 90 serving as a deposit for the key, and with the coin to be returned when the key is returned and the lock is unlocked. This particular arrangement is adapted for use, for example at a swimming pool where a club member wishes to use a locker, but with the coin being returned to the user of the locker only when the key is returned and the lock is unlocked. Since lever 110 is restrained from moving all the way to the left, as explained, return bend 166 of lever 110 forms an obstruction across the back of coin receiving slot 88, so that no coins can be inserted, inadvertently, into the lock as might be done by an unobserving potential user of the locker. The location of return bend 166 is such that even the smallest coin cannot be inserted.

With the parts of the lock assembly in the position shown in FIG. 5 when the key is returned and inserted into the lock barrel 52 the key can be turned in a clockwise direction to unlock the lock causing lug 72 to move away from behind lever 76 with lever 76 and lever means 110 moving under the action of their respective ribbon springs to return the lever 76 and the lever means 110 to the initial unlocked position seen in FIG. 2. As the lever means 110 moves in clockwise direction the lower edge of the coin 90 drops off of the shelf 138 and the coin drops out of the funnel 136, with the coin either dropping down into a coin box, in the event the coin is to be retained, or dropping into a coin chute to return the coin to the outside of the locker in the event the coin is to be returned to the user of the equipment. The turning of the lock barrel 52 and latch mechanism 48 by the key to the unlocked position of FIG. 2 causes lug 68 of the latch mechanism 48 to again engage behind pin 74 of lever 76 to hold the lock barrel 52 and lock bolt 44 in the unlocked position of FIG. 2.

It will be noted that on the latch mechanism 48 an intermediate lug 70 is provided. If only lugs 68 and 72 were provided it is conceivable that in the process of unlocking the lock the key could be turned so slowly that under certain conditions the door of the locker could be opened before the pin 74 of lever 76 would be able to hook behind the lug 68 to keep the latch in the unlocked position. If this could happen the lock could be used over and over again without paying money. To eliminate this unauthorized and felonious operation of the lock the lug 70 has been provided so that in the process of unlocking the lock pin 74 will slide in back of lug 70 when the lock bolt 44 is still extending out far enough to keep the door locked but the locking of pin 74 in back of the lug 70 will prevent a complete locking of the lock again before first completely opening it to re-establish parts in the position shown in FIG. 2.

Whereas it is the most common to have to pay for the use of the lock and locker for the purpose of storing and locking a suitcase or the like therein, it is sometimes advisable to have a locker system in which it is necessary to pay for the unlocking of the lock. In a typical example, the paying to unlock the lock can be utilized with a ball reservation in a bowling alley. The patrons want a ball of a certain number reserved for their use. For this service a nominal fee is often required. In operation the proprietor of the bowling alley would place certain balls in certain lockers, locking them, and it would be necessary for the patron to pay a coin to unlock the locker to get the particular ball he reserved. The lock of the present invention can be converted by a very minor change to perform this operation. FIG. 23 of the drawings shows such a converted lock wherein a coin must be utilized to effect the unlocking of the lock, and FIGS. 24, 25 and 26 show the converted latch and lock mechanism to be substituted for the latch 48 and lock barrel 52 of the form of the invention already described.

In the lock of FIGS. 23 to 26, it is not necessary to have a precision key lock to operate the bolt because the proprietor of the bowling establishment would lock all of the lockers or cabinets at the same time, and therefore any special tool that would do this would be permissible. The latch and lock mechanism of FIGS. 24 to 26 includes a barrel body 150 which extends all the way through the lock from the rear wall 36 to the front channel 30. This locked barrel is held in place in the rear wall very much the same as explained for the lock and latch assembly 42 of the form of the invention already described in detail. The retaining washer 50 would not have to have elongated slots 62 therein for the reason that there is no need for removal of the barrel body 150 for service reasons. The barrel body 150 is provided with a deep round hole 152 and a shorter hexagonal hole 154 to fit a hexagonal bar of the Allen wrench type. The insertion of this tool in the lock allows the lock barrel 150 to be readily turned.

Only one lug 156 is provided on the lock barrel 150, and because the lock of FIG. 23 operates on a reversed principle a torsion spring 158 is provided which tends to turn the lock barrel 150 in a clockwise direction rather than in a counter-clockwise rotation as previously described. In FIG. 23 the lock is shown in the open position. Assuming that an object has been placed in the locker, a simple hexagonal tool can be inserted through lock barrel 150 so as to turn the lock bolt 44a in counter-clockwise rotation until the pin 74 of lever 76 hooks in back of the extending lug 156 to thus hold the lock in the locked position.

Now in order to obtain the object or article placed in the locker it is only necessary to insert a coin into the coin receiving slot in the same manner as previously performed and to push the knob 130 to the right. This motion moves lever 76 to the right until the pin 74 disengages from the lug 156 which causes the lock bolt 44a to swing clockwise under the force of spring 158, thus opening the locker and allowing the removal of the article stored therein. A bracket 160 is fastened to the rear wall 36 of the lock by rivets 162. The bracket has a forwardly extending arm 164 which engages with the lug 156 to act as a stop to limit the opening movement of the lock bolt 44a, all as illustrated in FIG. 23.

While a certain representative embodiment and details have been shown for the purpose of illustrating the invention it will be apparent to those skilled in this art that various changes and modifications may be made therein without departing from the spirit or scope of the invention.

What is claimed is:

1. The combination in a coin and key operated lock of a lock bolt, a rotatably mounted barrel secured to the bolt and movable through a locking and unlocking arc, means resiliently urging the barrel towards one end of the arc, a key barrel adapted to be secured in the barrel, means releasably securing the key barrel in the barrel, a key in said key barrel and adapted to turn the barrel and bolt towards the opposite end of the arc from that to which it is urged by the resilient means, lug means on the barrel, a pin engaging the lug means for holding the barrel against rotation in the direction of urging of the resilient means, a pivotally mounted lever supporting the pin, a spring urging the lever toward the barrel, frame means covering all of the foregoing mechanism except the end of the key barrel and having a coin receiving slot, lever means pivotally mounted behind the frame means adjacent the coin receiving slot, said lever means having a coin receiving slot adapted to be aligned with the slot in the frame means, adjustably positioned means for limiting the entering movement of a coin into the aligned slots to thereby adapt the combination to different sized coins, handle means on said lever means extending to the outside of the frame means for moving the lever means in an arc, a spring resisting such movement, the coin receiving slot in said lever means engaging opposite sides of a proper sized coin inserted through the aligned slots and adapted to move the coin bodily sideways under the action of the handle means and past the adjustably positioned means, an extension on the pivotally mounted lever being engaged by the coin during such movement and at an area on the coin remote from that engaged by the coin receiving slot of the lever means to move the pin out from behind the lug means to cause the bolt to move to the one end of its arc by the action of the resilient means, a second lug means on the barrel holding the lever against full return movement upon release of the handle means but allowing partial return movement to release the coin, means on the lever means for temporarily receiving the coin, means on the lever means for engaging the lever to prevent full return movement of the lever means, means on the lever means for covering the coin receiving slot when the lever means has not fully returned to its initial position, the key being removable from the barrel in locked position and upon return being adapted to rotate the barrel to its initial unlocked position to re-establish all parts in their initial position, the means for temporarily receiving the coin including a shelf terminating short of full return movement of the lever means to its initial position whereby the coin is dropped out of the lock before full return movement of the lever means.

2. The combination in a coin and key operated lock of a lock bolt, a rotatably mounted barrel secured to the bolt and movable through a locking and unlocking arc, means resiliently urging the barrel towards one end of the arc, a key barrel adapted to be secured in the barrel, means releasably securing the key barrel in the barrel, a key in said key barrel and adapted to turn the barrel and bolt towards the opposite end of the arc from that to which it is urged by the resilient means, lug means on the barrel, a pin engaging the lug means for holding the barrel against rotation in the direction of urging of the resilient means, a pivotally mounted lever supporting the pin, a spring urging the lever toward the barrel, frame means covering all of the foregoing mechanism except the end of the key barrel and having a coin receiving slot, lever means pivotally mounted behind the frame means adjacent the coin receiving slot, said lever means having a coin receiving slot adapted to be aligned with the slot in the frame means, means for limiting the entering movement of a coin into the aligned slots, handle means on said lever means extending to the outside of the frame means for moving the lever means in an arc, a spring resisting such movement, the coin receiving slot in said lever means engaging opposite sides of a proper sized coin inserted through the aligned slots and adapted to move the coin bodily sideways past the limiting means under the action of the handle means, an extension on the pivotally mounted lever being engaged by the coin during such movement and at an area on the coin remote from that engaged by the coin receiving slot of the lever means to move the pin out from behind the lug means to cause the bolt to move to the one end of its arc by the action of the resilient means, a second lug means on the barrel holding the lever against full return movement upon release of the handle means but allowing partial return movement to release the coin, means on the lever means for engaging the lever to prevent full return movement of the lever means, means on the lever means for covering the coin receiving slot when the lever means has not fully returned to its initial position.

3. The combination in a coin and key operated lock of a lock bolt, a rotatably mounted barrel secured to the bolt and movable through a locking and unlocking arc, means resiliently urging the barrel towards one end of the arc, a key barrel adapted to be secured in the barrel, means releasably securing the key barrel in the barrel, a key in said key barrel and adapted to turn the barrel and bolt towards the opposite end of the arc from that to which it is urged by the resilient means, lug means on the barrel, a pin engaging the lug means for holding the barrel against rotation in the direction of urging of the resilient means, a pivotally mounted lever supporting the pin, a spring urging the lever toward the barrel, frame means covering all of the foregoing mechanism except the end of the key barrel and having a coin receiving slot, lever means pivotally mounted behind the frame means adjacent the coin receiving slot, said lever means having a coin receiving slot adapted to be aligned with the slot in the frame means, means for limiting the entering movement of a coin into the aligned slots, handle means on said lever means extending to the outside of the frame means for moving the lever means in an arc, a spring resisting such movement, the coin receiving slot in said lever means engaging opposite sides of a proper sized coin inserted through the aligned slots and adapted to move the coin bodily sideways past the means for limiting and under the action of the handle means, and an extension on the pivotally mounted lever being engaged by the coin during such movement and at an area on the coin remote from that engaged by the coin receiving slot of the lever means to move the pin out from behind the lug means to cause the bolt to move to the one end of its arc by the action of the resilient means.

4. A coin and key operated lock including frame means having a coin receiving slot, a key, a barrel receiving the key and rotatably mounted in the frame means, said key being removable from the barrel only when the barrel is in locked position, a bolt secured to the barrel, means resiliently urging the barrel and bolt to locked position, a lever pivotally secured behind the frame means and having a latching engagement with the barrel to hold it in unlocked position, lever means pivotally secured behind the frame means and having a coin receiving slot aligning with the coin receiving slot of the frame means, means adjustably limiting the reception of a coin in the aligned coin receiving slots to adapt the lock to operations upon different sized coins, a handle on the lever means and extending outside the frame means to swing the lever means towards the lever when a proper sized coin is received by the slots, the coin being cocked and pinched along one edge in the coin slot of the lever means and engaging at a spaced point with the lever to act through the bend resistance of the coin to swing the lever to unlatching position in relation to the barrel whereby the means resiliently urging the barrel rotate it and the bolt to locked position, means covering the coin slot in the frame means with the lock locked, means holding the lever and lever means in other than initial position with the lock locked, and means returning all parts to the initial unlocked position and when the key is inserted in the barrel and turned to unlock the lock.

5. A coin and key operated lock including frame means having a coin receiving slot, a key, a barrel receiving the key and rotatably mounted in the frame means, said key being removable from the barrel only when the barrel is in locked position, a bolt secured to the barrel, means resiliently urging the barrel and bolt to locked position, a lever pivotally secured behind the frame means and having a latching engagement with the barrel to hold it in unlocked position, lever means pivotally secured behind the frame means and having a coin receiving slot aligning with the coin receiving slot of the frame means, a handle on the lever means and extending outside the frame means to swing the lever means towards the lever when a proper sized coin is received by the slots, the coin being cocked and pinched along one edge in the coin slot of the lever means and engaging along a diametrically opposite edge with the lever to act through the bend resistance of the coin to swing the lever to unlatching position in relation to the barrel whereby the means resiliently urging the barrel rotate it and the bolt to locked position, means covering the coin slot in the frame means with the lock locked, means holding the lever and lever means in other than initial position with the lock locked, and means returning all parts to the initial unlocked position and when the key is inserted in the barrel and turned to unlock the lock.

6. A coin and key operated lock including frame means having a coin receiving slot, a key, a barrel receiving the key and rotatably mounted in the frame means, said key being removable from the barrel only when the barrel is in locked position, a bolt secured to the barrel, means resiliently urging the barrel and bolt to locked position, a lever pivotally secured behind the frame means and having a latching engagement with the barrel to hold it in unlocked position, lever means pivotally secured behind the frame means and having a coin receiving slot aligning with the coin receiving slot of the frame means, a handle on the lever means and extending outside the frame means to swing the lever means towards the lever when a proper sized coin is received by the slots, the coin being cocked and pinched along one edge in the coin slot of the lever means and engaging at a spaced area with the lever to act through the bend resistance of the coin to swing the lever to unlatching position in relation to the barrel whereby the means resiliently urging the barrel rotate it and the bolt to locked position, and means covering the coin slot in the frame means with the lock locked.

7. A coin operated lock including a barrel, means rotatably mounting the barrel, a bolt operated by the barrel, means resiliently urging the barrel and bolt to locked position, a lever having a latching engagement with the barrel to hold it in unlocked position, lever means having a coin receiving slot, means to swing the lever means towards the lever when a proper sized coin is received by the slot, the coin being cocked and pinched along one portion in the coin slot of the lever means and engaging along an opposite side portion of the coin with the lever to apply a transverse force to act through the bend resistance of the coin to swing the lever to unlatching position in relation to the barrel whereby the means resiliently urging the barrel move it and the bolt to locked position.

8. A coin operated lock including frame means having a coin receiving slot, a barrel rotatably mounted in the frame means, a bolt secured to the barrel, means resiliently urging the barrel and bolt to an extreme position, a lever pivotally secured behind the frame means and having a latching engagement with the barrel to hold it in an opposite extreme position, lever means pivotally secured behind the frame means and having a coin receiving slot aligning with the coin receiving slot of the frame means, a handle on the lever means and extending outside the frame means to swing the lever means towards the lever when a proper sized coin is received by the slots, the coin being cocked and pinched along one portion in the coin slot of the lever means and engaging at a spaced portion with the lever to act through the bend resistance of the coin to swing the lever to unlatching position in relation to the barrel whereby the means resiliently urging the barrel rotate it and the bolt to the said extreme position.

9. The combination in a coin operated lock of a bolt, a pair of interchangeable torsion springs adapted to move the bolt in opposite directions, one of the springs being selected and applied to the bolt, a pair of interchangeable latch means each adapted to latch the bolt against the action of one of the torsion springs, one of the latch means being selected and applied to hold against the selected torsion spring, and coin operated means for releasing the latch means.

10. A coin operated lock including frame means having a coin receiving slot, a barrel rotatably mounted in the frame means, a bolt secured to the barrel, means for moving the barrel and bolt to an extreme position, a lever pivotally secured behind the frame means and having a latching engagement with the barrel to hold it in an opposite extreme position, lever means pivotally secured behind the frame means and having a coin receiving slot aligning with the coin receiving slot of the frame means, a handle on the lever means and extending outside the frame means to swing the lever means towards the lever when a proper sized coin is received by the slots, the coin being cocked and pinched along one portion in the coin slot of the lever means and engaging at a spaced portion with the lever to act through the bend resistance of the coin to swing the lever to unlatching position in relation to the barrel.

11. A coin operated lock including frame means having a coin receiving slot, a barrel rotatably mounted in the frame means, a bolt secured to the barrel, means for moving the barrel and bolt to an extreme position, a lever pivotally secured behind the frame means and having a latching engagement with the barrel to hold it in an opposite extreme position, lever means pivotally secured behind the frame means and having a coin receiving slot aligning with the coin receiving slot of the frame means, a handle on the lever means and extending outside the frame means to swing the lever means towards the lever when a proper sized coin is received by the slots, the coin being cocked and pinched along one portion in the coin slot of the lever means and engaging at a spaced portion with the lever to act through the bend resistance of the coin to swing the lever to unlatching position in relation to the barrel, and means for holding the lever in unlatched position as long as the barrel and bolt are in said extreme position.

12. The combination in a coin operated lock of a bolt, resilient means tending to move the bolt to one position, latch means holding the bolt in opposite position, means for receiving a metal coin and for releasing the latch means whereby the bolt is moved by the resilient means to said one position, and means for temporarily retaining the coin in said receiving means until the bolt is returned to said opposite latched position whereupon the coin is discharged from said receiving means.

References Cited in the file of this patent

UNITED STATES PATENTS

| | | |
|---|---|---|
| 1,100,593 | Madison | June 16, 1914 |
| 1,284,045 | Berns | Nov. 5, 1918 |
| 2,603,335 | Beimel | July 15, 1952 |
| 2,861,667 | Smith | Nov. 25, 1958 |
| 3,028,941 | McDonnell | Apr. 10, 1962 |